Figure 1:
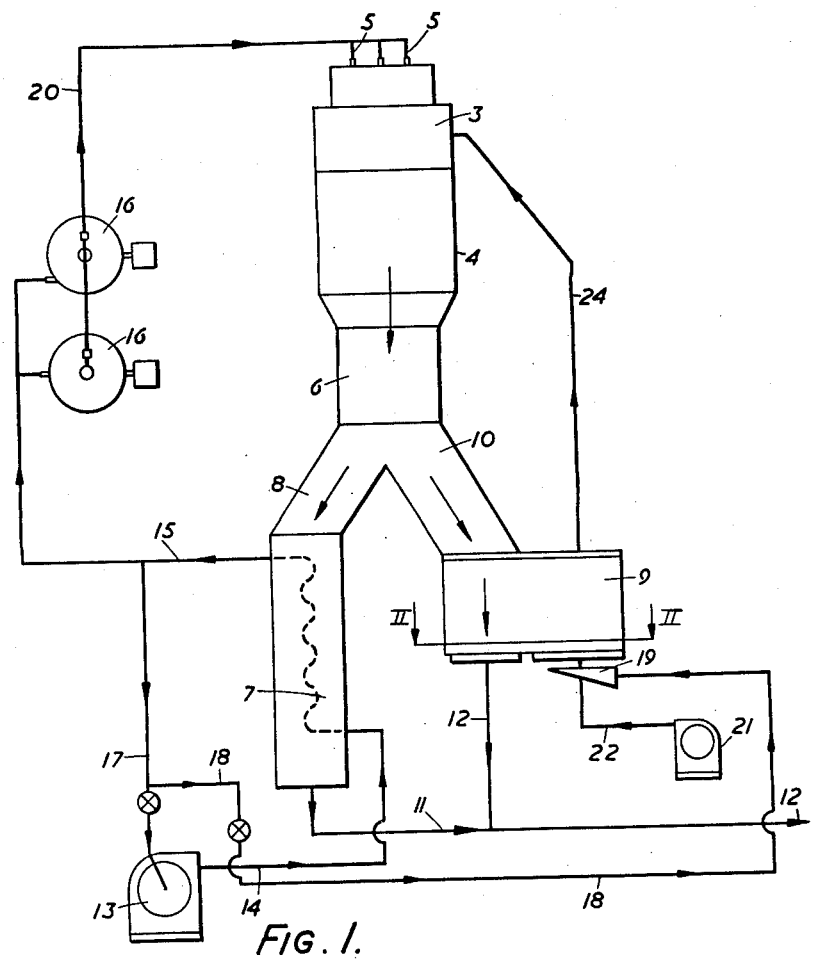

INVENTOR
LEONARD H. LEESON,
BY
ATTORNEY 3,156,200
FURNACE COMPRISING REGENERATIVE
HEAT EXCHANGERS
Leonard Herbert Leeson, Normanton, Derby, England, assignor to International Combustion (Holdings) Limited, London, England, a British company
Filed Nov. 28, 1961, Ser. No. 155,406
Claims priority, application Great Britain, Dec. 1, 1960, 41,417/60
1 Claim. (Cl. 110—56)

The present invention relates to regenerative heat exchangers and in particular to regenerative air heaters used in apparatus for supplying heated air for combustion in furnaces.

In the furnaces of steam generators, the combustion air is usually pre-heated by being brought into heat exchange relationship with the hot flue gases passing from the furnaces. The heat exchangers employed for this purpose as air heaters may be of the recuperative type, in which the flue gases and the air each have permanently separate paths, or of the regenerative type, in which flue gases and air alternately pass through the same paths in a matrix of heat storage material. The recuperative air heaters may be formed from spaced metal plates or from spaced metal tubes.

All types of air heater are normally used with a counter current flow and the heat exchange surfaces at one end of the air heater are swept both by cooled gases and cold air. As the resulting low temperature (necessary for thermal efficiency) may be below the dew point of the gases there is a strong risk of corrosion initiated by condensation of moisture containing sulphur oxides from the flue gases. This risk may be reduced by recirculating part of the heated air to raise the temperature at the cold end of the air heated. This is a more effective measure in the case of recuperative air heaters than in the case of regenerative air heaters, since the air leaving the latter is dirty having followed the path of flue gases with their inevitable deposition. The fans supplying the air may then have to accept this dirty air to their obvious detriment.

The growth in the size of steam generators, however, has favoured the use of regenerative air heaters for which can be claimed the advantage of relative compactness. Continued growth in the size of steam generators burning pulverised coal has led to other developments which are not fully compatible with regenerative heat exchangers. The increased consumption of fuel has led to modifications of the fuel feeding systems such as the use of a pressurised pulverising mill. In order to achieve acceptable fuel flow rates, and adequate fuel drying, hot air is supplied to the mills under pressure; one weakness of regenerative air heaters is the problem of sealing the junction of the moving and stationary members of the air heaters and these seals are now subjected to higher pressure differentials, the result being increased leakage across the seals. Again, the recuperative air heater overcomes this problem but still presents the problem of bulk.

It is accordingly an object of the present invention to provide air heating apparatus for a pulverized fuel fired furnace having a pressurized pulversing mill and a regenerative air heater in which leakage across the seals of the air heater is substantially reduced.

According to the present invention primary air is supplied to a pulverised fuel fired furnace from primary air supply means through air passes of a recuperative air heater and a pressurized pulverising mill in series with said recuperative air heater and secondary air is supplied to the furnace from secondary air supply means through a regenerative air heater.

The arrangement is such that, in operation, heated primary air is supplied to the pulverising mill at the requisite pressure for the working of the mill and the secondary air is supplied at a pressure below said requisite pressure. The primary air, which represents say 25% of combustion air required by the furnace, is supplied through permanently defined air-heating paths without leakage. The remaining proportion of the combustion air is supplied through the regenerative air heater at a lower pressure and leakage across the seals is obviously much less than when all the air is supplied at the requisite pressure for the pressurized pulverising mill.

Because of spatial and/or economic reasons it may be preferable to use a group of regenerative air heaters connected in parallel for the supply of secondary air.

A recuperative air heater is distinguished in respect of the present invention as a heat exchanger of a type providing permanently separate paths for gas and air, such as a plate type air heater or a tubular air heater.

The metal temperature of the recuperative air heater may be raised by partial recirculation of the air heated therein and a further small quantity of heated air may be bled off from the recuperative air heater to a portion at the cold end of the or each regenerative air heaters whereby the matrix metal temperature is raised towards and even above the dewpoint, so reducing cold-end corrosion in the regeneration heat exchangers.

Further according to the invention, a method of supplying heated air to a pulverised fuel fired furnace having a pressurised pulverising mill comprises supplying heated primary air under the requisite pressure to said mill and hence to the furnace through a recuperative air heater and supplying further secondary air required for combustion to the furnace at a pressure below said requisite pressure through at least one regenerative air heater.

Figure 2:
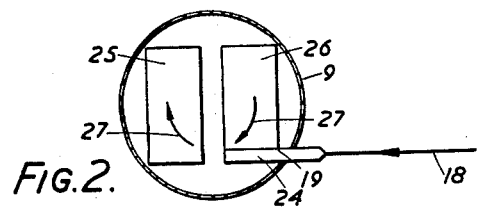

One embodiment of the invention will now be described by way of example with reference to the accompanying drawing in which:

FIG. 1 diagrammatically shows an arrangement for feeding fuel and air to a pulverised fuel burning furnace, and, FIG. 2 shows a section through line II—II of FIG. 1 on an enlarged scale.

In the drawing, combustion chamber 3 of a boiler unit is provided with a series of pulverised coal burners 5. An economiser section 6 is provided in the gas path of the furnace and the gas path is then divided, a recuperative plate air heater 7 being located in duct 8 and a rotary regenerative air heater 9 being located in duct 10. Gases leaving the plate air heater at 11 and gases passing through the rotary regenerative air heater 9 are conducted to the chimney of the unit by a duct indicated at 12.

Primary combustion air is taken in by a primary air fan 13 and fed under high pressure via the duct indicated at 14 to the plate air heater 7 and hence by a duct indicated at 15 to a pair of pressurised pulverising mills 16. A recirculating duct 17 connects duct 15 to the primary air fan 13 and to a warm air duct 18 feeding a distributor 19 in the rotary regenerative air heater 9.

A duct 20 carries a mixture of fuel and primary combustion air from the pressurised pulverising mills 16 to the burners 5.

A secondary air fan 21 and an air duct 22 introduce air to passages 26 of the rotary regenerative air heater 9 through the distributor 19. After passing through the regenerative air heater 9 the hot air is introduced into the combustion chamber 3 by a secondary air duct 24. The combustion air fan 21 supplies air at a pressure much lower than that supplied by the air fan 13 to the pressurised pulverising mills 16 and is accordingly much more acceptable to the seals of the rotary regenerative air heater 9.

In operation, primary hot air is supplied by the primary air fan 13 to the pressurised mills 16 through duct 14, plate air heater 7 and duct 15 and hence carries pulverised fuel through duct 20 to the burners 5. A small proportion of the hot air leaving the plate air heater 7 is bled off through the recirculating duct 17, part of this hot air returning to the air fan 13 and raising the temperature of air entering the plate air heater 7, and the remaining part of this hot air passes along duct 18 into distributor 19 where it raises the temperature of cold air supplied to the rotary regenerative air heater by the combustion air fan 21 through the air duct 22.

The hot air recirculated to the plate air heater 7 is clean and does not therefore cause any damage to the fan 13. This recirculation of hot air maintains the metal temperature at the cold end of the plate air heater 7 and thus reduces corrosion in the well-known manner. The hot air passed through duct 18 is distributed to the rotary regenerative air heater 9 through the distributor 19. The hot air raises the metal temperature at the cold end of the rotary regenerative heat exchanger 9 towards and even above the dewpoint, thus reducing the corrosion in the manner of recirculation. Unlike recirculation, however, this hot air, supplied by the apparatus according to the present invention, is clean and so neither damages the fans (as would normal recirculation with a regenerative heat exchanger) nor adds to the congestion of the matrix passages.

FIG. 2 is a cross section on line II—II of FIG. 1 of the rotary regenerative air heater 9 included in the apparatus of the present invention. The hot flue gases flow through passages 25 of the regenerative air heater 9 whilst the air flows through passages 26. The direction of rotation of the moving parts of the air heater 9 is indicated by arrows 27, and the warm air is introduced into the passages 26 by distributor 19 via the connector 24.

I claim:

A pulverized fuel fired furnace comprising, in combination: a combustion chamber; pulverized fuel burners firing into said combustion chamber; a combustion products outlet duct connected to receive combustion products from said combustion chamber and having a first branch for receiving a portion of the combustion products and a second branch for receiving the remainder of the combustion products; a secondary air supply system for said combustion chamber including a source of cool secondary air, a regenerative air heater located in said first branch and having an air inlet duct and an air outlet duct, and duct connecting means interconnecting said source with said regenerative air heater air inlet duct and said regenerative air heater air outlet duct with said combustion chamber; and a primary air supply system for said burners including a primary air blower having an air inlet duct separate from the source of secondary air, and an air outlet duct, a recuperative air heater located in said second branch and having an air inlet duct and an air outlet duct, a fuel pulverizing unit having an air inlet duct and an air-fuel mixture outlet duct connected to said burners, and further duct connecting means interconnecting said primary air blower air outlet duct with said recuperative air heater air inlet duct, said recuperative air heater air outlet duct with said fuel pulverizing air inlet duct, said recuperative air heater air outlet duct with said recuperative air heater air inlet duct to permit recirculation of heated air through said recuperative air heater, and said recuperative air heater air outlet duct with said regenerative air heater air inlet duct to permit recirculation of part of the hot air output of said recuperative air heater to said regenerative air heater.

References Cited in the file of this patent

UNITED STATES PATENTS

| | | |
|---|---|---|
| 2,159,849 | Graemiger | May 23, 1939 |
| 2,231,872 | Bailey et al. | Feb. 18, 1941 |
| 2,363,870 | Karlsson et al. | Nov. 28, 1944 |
| 2,468,826 | Karlsson et al. | May 3, 1949 |
| 2,582,830 | Hawley | Jan. 15, 1952 |
| 2,697,408 | Crites | Dec. 21, 1954 |
| 2,744,733 | Howes | May 8, 1956 |
| 2,809,811 | Blomquist | Oct. 15, 1957 |
| 2,831,637 | Mittendorf et al. | Apr. 22, 1958 |